US006086635A

United States Patent [19]

Berndt et al.

[11] Patent Number: 6,086,635

[45] **Date of Patent: *Jul. 11, 2000**

[54] SYSTEM AND METHOD FOR EXTRACTING WATER IN A DRY CLEANING PROCESS INVOLVING A SILOXANE SOLVENT

[75] Inventors: Wolf-Dieter R. Berndt, Incline Village, Nev.; John McLeod Griffiss, San Francisco; James E. Douglas, El Dorado Hills, both of Calif.

[73] Assignee: GreenEarth Cleaning, LLC, Leawood, Kans.

[ * ] Notice: This patent is subject to a terminal disclaimer.

[21] Appl. No.: 09/353,212

[22] Filed: Jul. 14, 1999

Related U.S. Application Data

[63] Continuation-in-part of application No. 09/115,352, Jul. 14, 1998, Pat. No. 5,942,007, which is a continuation-in-part of application No. 08/918,629, Aug. 22, 1997, Pat. No. 5,865, 852.

[51] Int. Cl.[7] ................................ D06L 1/08; D06L 1/10; B01D 17/04; B01D 17/02

[52] U.S. Cl. ........................ 8/142; 8/141; 8/159; 134/10; 134/12; 134/19; 134/25.1; 134/25.4; 134/34; 68/18 R; 68/18 C; 68/18 D; 68/18 F; 68/19.2; 210/DIG. 5; 210/167; 210/258; 210/96.1; 210/123; 210/104; 210/112

[58] Field of Search ................................ 8/142, 141, 159; 134/10, 12, 19, 25.1, 25.4, 34; 68/18 R, 18 C, 18 D, 18 F, 19.2; 210/DIG. 5, 167, 258, 96.1, 123, 104, 112

[56] References Cited

U.S. PATENT DOCUMENTS

| | | | |
|---|---|---|---|
| 2,176,705 | 10/1939 | Derby . | |
| 2,697,075 | 12/1954 | Echols . | |
| 2,941,952 | 6/1960 | Lewis et al. . | |
| 3,123,494 | 3/1964 | Charreau | 8/142 |
| 3,451,234 | 6/1969 | Palmer | 68/18 C |
| 3,630,660 | 12/1971 | Wedler . | |
| 3,910,848 | 10/1975 | Froehlich et al. . | |
| 4,011,158 | 3/1977 | Cook | 516/136 |
| 4,136,045 | 1/1979 | Gault et al. . | |
| 4,171,264 | 10/1979 | Benson et al. | 516/136 |
| 4,306,990 | 12/1981 | Goodman et al. . | |
| 4,324,595 | 4/1982 | Kasprzak . | |
| 4,337,166 | 6/1982 | Hill et al. . | |
| 4,501,682 | 2/1985 | Goodman et al. . | |
| 4,685,930 | 8/1987 | Kasprzak . | |
| 4,708,807 | 11/1987 | Kemerer . | |

(List continued on next page.)

FOREIGN PATENT DOCUMENTS

| | | |
|---|---|---|
| 103228 | 3/1984 | European Pat. Off. . |
| 0577563 | 1/1994 | European Pat. Off. . |
| 0609456 | 8/1994 | European Pat. Off. . |
| 766725 | 9/1998 | European Pat. Off. . |
| 3739711 | 6/1989 | Germany . |
| 6-327888 | 11/1994 | Japan . |

OTHER PUBLICATIONS

Environmental Protection Agency; Perchloroethylene Dry Cleaning Facilities; General Recommended Operating and Maintenance Practices for Dry Cleaning Equipment.

*Primary Examiner*—Alan Diamond
*Attorney, Agent, or Firm*—Hickman Stephens Coleman & Hughes, LLP

[57] ABSTRACT

A system and method are provided for separating water from a solvent during dry cleaning. Included is an inlet capable of receiving a mixture of dry cleaning fluid and water from a basket of a dry cleaning apparatus. The dry cleaning fluid includes a siloxane composition. Also provided is a flow controller for urging a flow of the mixture received from the outlet. Coupled to the flow controller is a coalescent media that receives the mixture urged by the flow controller. A chamber is coupled to the coalescent media for receiving the mixture from the coalescent media to separate the water and the dry cleaning fluid. Also coupled to the chamber is an outlet to remove the dry cleaning fluid from the chamber in the absence of the water.

18 Claims, 4 Drawing Sheets

U.S. PATENT DOCUMENTS

| | | | |
|---|---|---|---|
| 4,961,753 | 10/1990 | Donkers et al. . | |
| 4,984,318 | 1/1991 | Coindreau-Palau . | |
| 5,219,371 | 6/1993 | Shim et al. . | |
| 5,301,379 | 4/1994 | Schaal . | |
| 5,302,313 | 4/1994 | Asano et al. . | |
| 5,309,587 | 5/1994 | Fierro . | |
| 5,357,771 | 10/1994 | Schaal . | |
| 5,676,705 | 10/1997 | Jureller et al. . | |
| 5,683,977 | 11/1997 | Jureller et al. . | |
| 5,702,535 | 12/1997 | Gray et al. . | |
| 5,789,505 | 8/1998 | Wilkinson et al. . | |
| 5,858,022 | 1/1999 | Romack et al. . | |
| 5,865,852 | 2/1999 | Berndt . | |
| 5,876,461 | 3/1999 | Racette et al. . | |
| 5,883,067 | 3/1999 | Kubo et al. . | |
| 5,888,250 | 3/1999 | Hayday et al. . | |
| 5,928,524 | 7/1999 | Casola | 210/802 |
| 5,942,007 | 8/1999 | Berndt et al. | 8/142 |
| 5,965,015 | 10/1999 | Ronan et al. | 210/87 |

SYSTEM AND METHOD FOR EXTRACTING WATER IN A DRY CLEANING PROCESS INVOLVING A SILOXANE SOLVENT

CROSS-REFERENCE TO RELATED APPLICATIONS

This application is a continuation-in-part of U.S. patent application Ser. No. 09/115,352 filed Jul. 14, 1998 now U.S. Pat. No. 5,942,007 which is in turn a continuation-in-part of U.S. patent application Ser. No. 08/918,629 filed Aug. 22, 1997 now U.S. Pat. No. 5,865,852 which are each incorporated herein by reference in their entirety. This application is also related to U.S. patent application Ser. Nos. 09/304,430; 09/304,222; 09/304,435; and 09/304,431 all of which were filed May 3, 1999 and which are each incorporated herein by reference in their entirety.

FIELD OF THE INVENTION

This invention is in the general field of dry cleaning of clothing, textiles, fabrics and the like, and is more particularly directed to a method and apparatus for extracting water from a dry cleaning solvent having unique density and specific weight characteristics.

BACKGROUND OF THE INVENTION

Dry cleaning is a major industry throughout the world. In the United States alone, there are more than forty thousand dry cleaners (many of these have multiple locations). The dry cleaning industry is an essential industry in the present economy. Many articles of clothing (and other items) must be dry cleaned in order to remain clean by removal of body fats and oils, and presentable by preventing shrinking and discoloring.

The most widely used dry cleaning solvent until now has been perchloroethylene (PERC). There are numerous disadvantages to PERC including inherent toxicity and odor.

Another problem in this field is that different fabrics require different handling in the presently used systems in order to prevent damage to the fabrics during the dry cleaning process.

Prior art dry cleaning processes include the use of various solvents with appropriate machinery to accomplish the cleaning. As mentioned earlier, the solvent most widely used has been PERC. PERC has the advantage of being an excellent cleaning solvent, but the disadvantage of being a major health and environmental hazard, i.e., it has been linked to numerous forms of cancer and it is very destructive to ground water and aquatic life. In some areas PERC is prohibited due to these disadvantages. Additionally, in the past, other solvents such as petroleum-based solvents or hydrocarbons have been tried and used. These various solvents are less aggressive than PERC, but are still classified as volatile organic compounds (VOC's). As such, such compounds are regulated and permitted by most air districts.

The dry cleaning industry has long depended on petroleum-based solvents and the well-known chlorinated hydrocarbons, perchlorethylene and trichlorethylene, for use in the cleaning of fabrics and articles of clothing. Since the 1940's, PERC was praised as being a synthetic compound that is non-flammable and has great degreasing and cleaning qualities ideal for the dry cleaning industry. Beginning in the 1970's, PERC was found to cause liver cancer in animals. This was an alarming discovery, as dry cleaning waste was placed in landfills and dumpsters at that time, from which it leached into soil and ground water.

Environmental Protection Agency regulations gradually were tightened, culminating in a law that took effect in 1996 that required all dry cleaners to have "dry to dry" cycles, meaning that fabrics and articles of clothing go into the machine dry and come out dry. These required "closed loop" systems can recapture almost all PERC, liquid or vapor. The process "cycle" involves placing fabrics or articles of clothing into a specially designed washing machine that can hold 15 to 150 pounds of fabrics or articles of clothing that are visible through a circular window. Prior to being placed into the machine, the fabrics or articles of clothing are checked and treated by local hand spotting for stains. If the fabric is unusual or known to be troublesome, the label is checked to verify that the manufacturer has deemed the item safe for dry cleaning. If not, the stain may be permanent. As an example, a sugar stain may not be seen, but once it is run through the dry cleaning process, it oxidizes and turns brown. If the stain is grease related, water won't help, but solvent will as it solubilizes grease. In fact, the principle reason for dry cleaning certain clothes (which should not be washed in a regular washing machine) is to remove the build up of body oils (known as fatty acids) because they too oxidize and produce rancid nasty smells.

The grease and fatty acids which build up in the solvent is removed by filtration and by distillation of the solvent. In other words, the dirty solvent is boiled and all vapors are condensed through a condensation coil back to a liquid. The liquid recovered is comprised of both solvent and water and the liquid is then passed through a separator in order to separate the two non-miscible liquids. The water may originate from the natural humidity of the ambient air exposed to the textiles prior to cleaning. Another source of moisture may be materials used during pre-spotting.

Before textiles are removed from the machine, the washer becomes a dryer. Hot air is blown through the compartment but, instead of being vented outside, the air stream goes through a condenser that condenses the vapors to liquid. The liquid then passes through a separator to decant off the water from the solvent and return the solvent for reuse.

If the water is not separated from the solvent, the water will carry over into an associated storage tank and due to its density will settle on the bottom of the tank. If the level of water is sufficient it will be picked up by the pump system and may be pumped onto the articles being cleaned which would result in damaging the articles.

If the water sits on the base tank for a sufficient amount of time, bacteria will begin to grow which will result in a very bad odor that will transfer to the articles being cleaned. The hydrocarbon solvent is a feed stock for bacteria and may quickly contributed to the growth of bacteria. The interface level between the lighter density solvent and the more dense water causes an interface level between the water and solvent. The polar solvent soluble contaminants in this interface level may include fatty acids, food, perspiration, and general body odor. The extended settling can quickly result in the growth of bacteria and the end result of odor.

It is therefore very critical for professional dry cleaning to control the presence of water in such a way as to not damage the articles being cleaned or cause odors that would result in customer dissatisfaction.

One of the criteria in the selection of a proper water/solvent separation system is the difference in the density or specific gravity of the solvent and water. The density or specific gravity of PERC (the most commonly used solvent) is 1.619, as compared to water which is 1.0. The next most commonly used type of solvent is the petroleum based type or hydrocarbon solvent whose specific gravity ranges between 0.754 and 0.820 with the most common hydrocarbon solvent (DF-2000) being 0.77. The greater the difference in specific gravity between the water and the solvent, the easier it is to separate the two. Gravity separators have been designed and are used when the solvent is either denser or less dense than the water and the density difference between the phases is greater than 0.03.

While systems have been developed to separate water and solvents with a specific gravity vastly departed from that of water (1.0), no efforts have been made to separate water and solvents with a specific gravity closer to 1.0.

SUMMARY OF THE INVENTION

The present invention employs a specific solvent which is derived from an organic/inorganic hybrid (organo silicone) whose specific gravity is 0.95. The closeness in density and specific gravity of the solvent with respect to that of water (1.0), plus the viscosity of the solvent, results in small globules of water during the dry cleaning process. Standard gravity separator used for decanting conventional solvent and water will not work with the (organo silicone) solvent.

To accommodate this need, the present invention includes a system and method for separating water from a siloxane solvent during dry cleaning. Included is an inlet capable of receiving a mixture of dry cleaning fluid and water from a basket of a dry cleaning apparatus. The dry cleaning fluid includes a siloxane composition. Also provided is a flow controller for urging a flow of the mixture received from the outlet. Coupled to the flow controller is a coalescent media that receives the mixture urged by the flow controller. A chamber is coupled to the coalescent media for receiving the mixture from the coalescent media to separate the water and the dry cleaning fluid. Also coupled to the chamber is an outlet to remove the dry cleaning fluid from the chamber in the absence of the water.

DESCRIPTION OF THE DRAWINGS

The aforementioned advantages of the present invention, as well as additional objects and advantages thereof, will be more fully understood hereinafter as a result of a detailed description of a preferred embodiment when taken in conjunction with the following drawing in which.

DISCLOSURE OF THE INVENTION

The present invention includes an apparatus and method used in conjunction for the dry cleaning of fabrics, textiles, leathers and the like.

Figure 1:
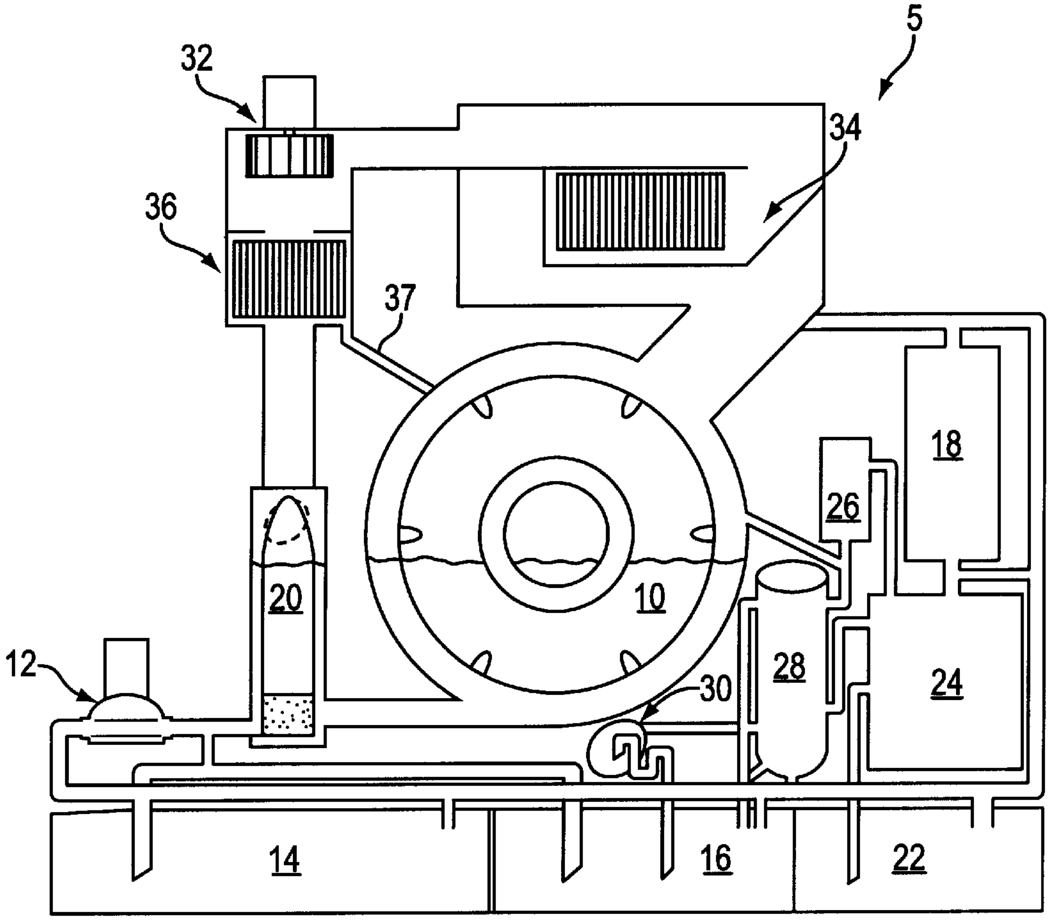
FIG. 1 is a schematic that represents a dry cleaning machine that is used with solvent that has a boiling point that requires vacuum distillation.

To perform the interrelated cleaning steps involving the present invention, a dry cleaning system 5 is shown schematically in FIG. 1, although it is recognized that alternative cleaning configurations can be used. It should be noted that the cleaning system 5 of FIG. 1 may be used for processing with a Class 3-A type solvent.

The dry cleaning of articles or other items begins by placing them in a horizontal rotating cleaning basket 10 of the system 5. The wash cycle is initiated with a dry cleaning fluid including an organo silicone-based siloxane solvent being pumped using a pump 12. The solvent is pumped from either a working tank 14, or a new solvent tank 16, and then to the cleaning basket 10 with the articles. The course of the pumped solvent can either be through a filter 18, or directly to the cleaning basket 10.

From the cleaning basket 10, the solvent is then circulated through the button trap 20 to the pump 12. After agitation for a predetermined amount of time, the solvent is drained and pumped to either of the three tanks 14, 16, and 22 shown in FIG. 1. The cleaning basket 10 is then centrifuged in order to extract the remaining solvent to any of the tanks that is the desired.

The types of filtration systems compatible with the particular solvent of the present invention are: a spin disc of a 20 and 30 micron type with diatomaceous earth being capable of optional use with the 30 micron spin disc; a tubular filtration (flex, rigid, or bump) also being capable of optional use with diatomaceous earth; a cartridge (carbon core, all carbon or the standard size, jumbo or split size); and Kleen Rite cartridge system which results in no need for a still. Filters may also be used with a dimension between 10 to 100 microns to filter condensed vapors prior to separation.

The solvent may be filtered so as to eliminate the particulate soil that is released from the articles being cleaned. Further, filtering of the silicone-based solvent eliminates the polymerization of the solvent even in the presence of catalysts.

The solvent being used for cleaning should be distilled at a rate of 10 to 20 gallons per hundred pounds cleaned, unless the aforementioned Kleen Rite cartridge system is being used. To accomplish this, a still 24 may be used to receive solvent from the filter 18, or from the dirty tank 22. The solvent in the dirty tank 22 can be introduced to the still through suction since the still is under a vacuum that is controlled by a float ball valve (not shown).

Any recovered or condensed vapors originating from the still may be condensed by water-cooled coils of a still vapor condenser 26. Thereafter, gravity urges the condensed solvent into a separator 28. The rate of flow, depending on the still, may range between 0.75 and 1.25 GPM, and the separator is engineered accordingly. Vacuum may be created by a liquid-head pump 30 or an evacuation process created by a venturi.

During the drying process, the articles are tumbled in the cleaning basket 10 with air being forced by a fan 32 over heating coils 34, which results in the incoming air flow to be between 120 and 180 degrees Fahrenheit. As the solvent and water remaining on the articles are heated and become vapor, the air flow exits the cleaning basket 10 and passes over cooling coils of a drying vapor condenser 36 where the vapors condense back to a liquid. Gravity feeds such liquid to the separator 28 via a conduit 37.

The vapor laden air that leaves the cleaning basket 10 ranges in temperature between 120 and 138 degrees Fahrenheit. This temperature is important in that it is 30 degrees Fahrenheit or more below the flash point of the aforementioned solvent. In one embodiment, the rate of flow of the condensed liquid may be limited to 0.75 GPM, and the separator may thus be engineered for the combined flow rate of condensed liquid from the still and drying vapor condensers 26 and 36.

Figure 2:
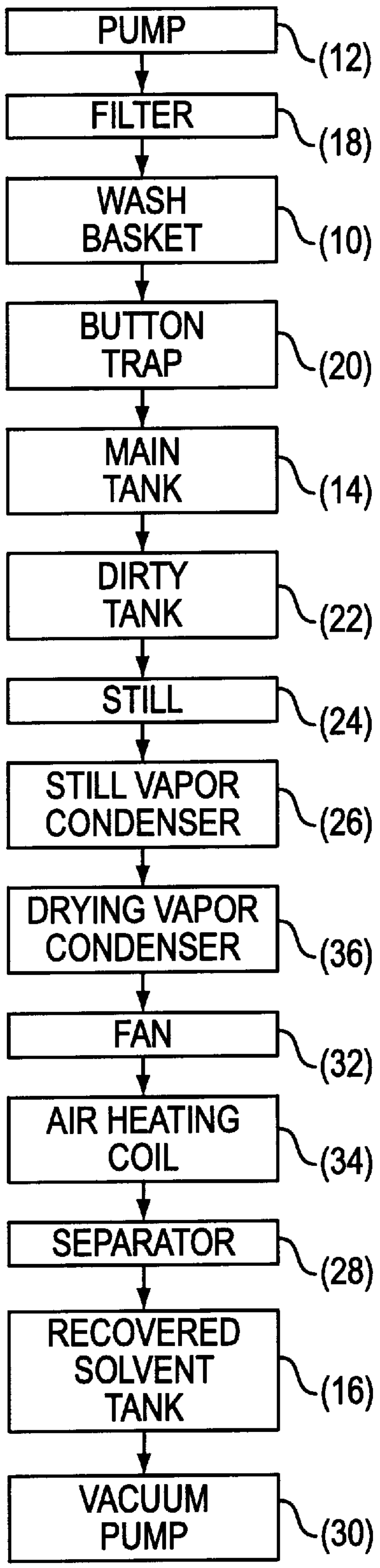
FIG. 2 is a flow diagram indicating the steps of the method of dry cleaning in accordance with one embodiment of the present invention.

FIG. 2 illustrates an order in which the various components of the present invention may be employed for clarification purposes. Having followed the foregoing process of dry cleaning, there is no less than one but as many as two or more sources of solvent to the separator. The ability to return re-condensed solvent to the dry cleaning system is dependent on the separator 28 and its efficiency.

Figure 3:
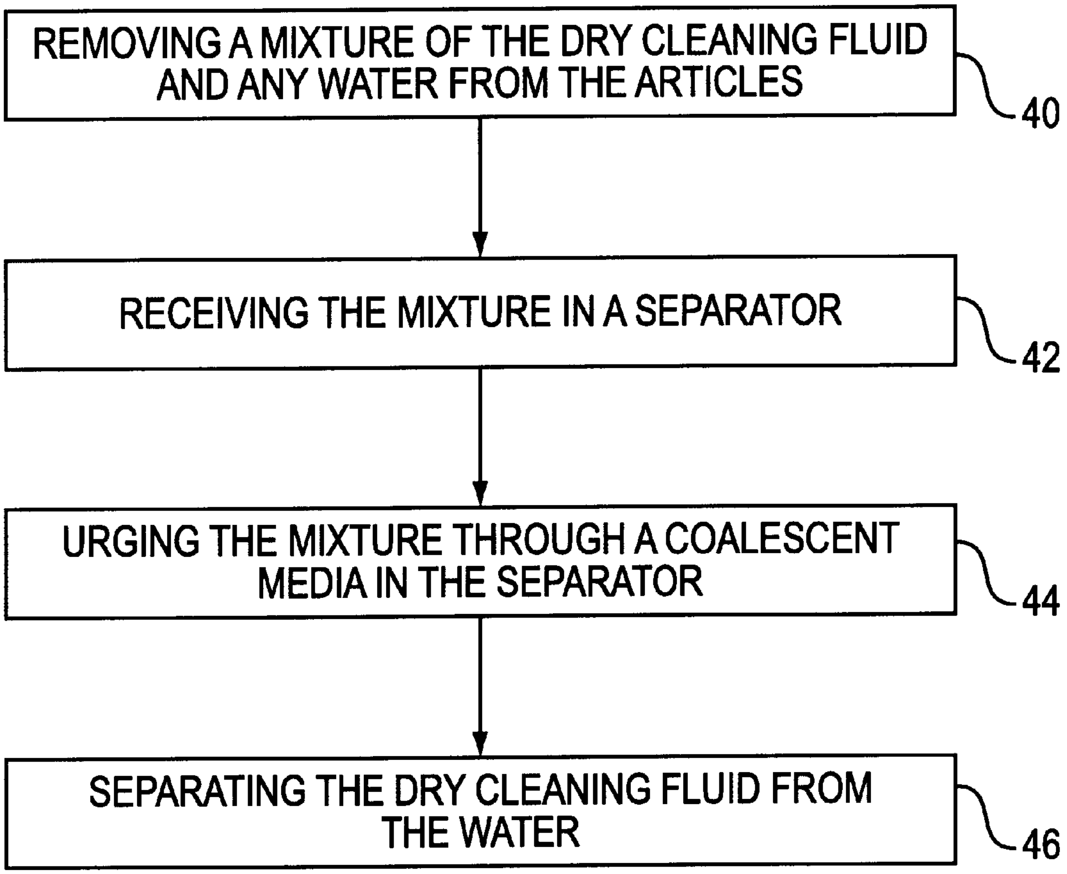
FIG. 3 is a flow diagram indicating the functional steps of the method of separating water from the solvent.

To afford such efficiency, a method of water and solvent separation is provided, as shown in FIG. 3. As shown, in operation 40, a mixture of the dry cleaning fluid and any water from the articles is removed during the dry cleaning process. The mixture is then received by the separator 28 in operation 42. Upon receipt, the mixture is urged through a coalescent media, as indicated in operation 44. Next, the dry cleaning fluid is separated from the water. Note operation 46.

Figure 4:
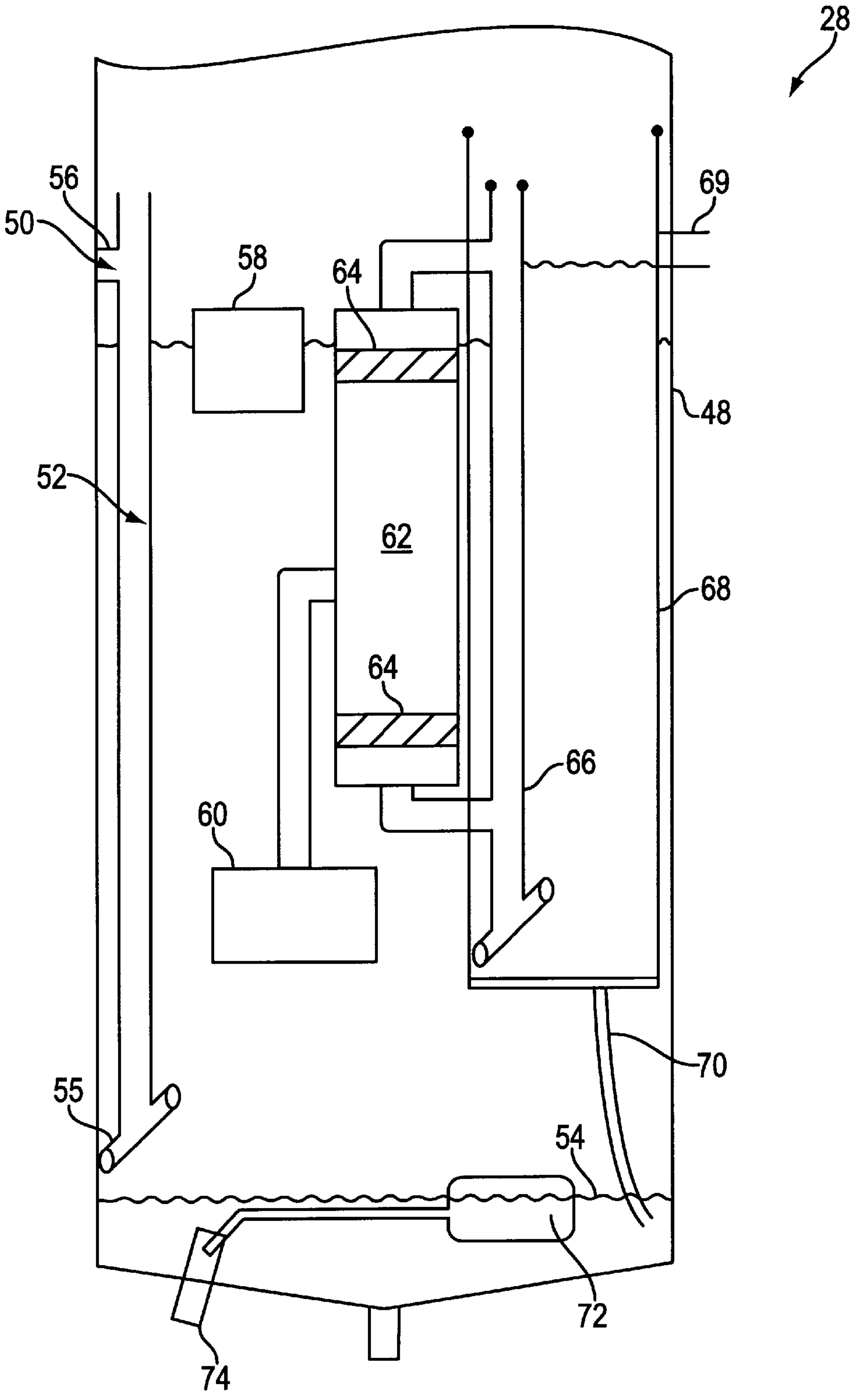
FIG. 4 is a schematic that represents the mechanism used in separating water from solvent wherein the density of both are very close, as set forth in FIG. 3.

FIG. 4 is a schematic of the separator 28 of one embodiment of the present invention which is capable of performing the method of FIG. 3. As the flow of the hydrated solvent, or mixture of water and dry cleaning fluid, approaches a main chamber 48 of the separator 28, the mixture may be filtered to prevent lint and particulate soil from entering the separator 28 which may in turn restrict a coalescent filter that is downstream. To accomplish such filtering, coalescent media 56 may be draped at the initial termination of an inlet tube 52. The various coalescent media of the present invention may include nylon or any other coalescing media. The plumbing connection from the vapor condensers 26 and 36 of the dry cleaning system 5 of FIG. 1 may be plumbed such that there are no low points where water can collect. This way, the flow of the mixture may be afforded as direct an entry as possible to the separator 28.

The hydrated solvent enters the separator 28 at 50 where gravity feeds it down the inlet tube 52 which terminates several inches above an interface level 54 between the water and the dry cleaning fluid. The silicone-based solvent is insoluble in water yet water, in micelle form, suspends itself in the hydrated solvent until they form globules of about 0.015 cm in diameter. Due to the combined weight, the globules settle to the bottom of the main chamber 48. The hydrated solvent flows horizontally out horizontal ends 55 of the inlet tube 52 to minimize turbulence.

As the overall liquid in the main chamber 48 rises, a float level switch 58 is tripped which in turn activates a submersible pump 60 that is rated up to 400 GPH. Such pump 60 draws the hydrated solvent from a level of between ⅓ and ½ the overall height of the main chamber 48. The liquid is then pumped by the pump 60 into a filter housing 62 which has a vertical cavity of between 2 and 20 inches.

The hydrated solvent is then forced or pulled through coalescent media 64 positioned within the filter housing 62. This media is between 2 and 12 inches in diameter with a cross-section between ¼ and 4 inches. It should be noted that there can be as many as three or more separate medium 64 positioned on the vertical cavity of the filter housing 62. The open cell configuration of a PFP polymer that may be used to construct the coalescent media 64 allows for the coalescing of the water micelles. Some of the water globules are created as the hydrated solvent is forced through the coalescent media 64 and appear on the outgoing side of the coalescent media 64.

The pump 60 may be electrical or pneumatic in form. The use of any flow controller such as the pump 60 or, in the alternative, a vacuum results in sufficient separation. The flow controller chosen should effect a flow of 0.5 to 2.5 GPM. If the inflow of hydrated solvent is greater than the coalescent media 64 will allow, the re-positioning of the float level switch 58 which activates the flow controller can be lowered to allow for a larger buffer for the hydrated solvent.

As the separated liquid leaves the filter housing 62, it enters a vertical tube 66 in another chamber 68 which allows the water globules to settle to a bottom thereof. The separated solvent flows out the solvent outlet 69.

The collected water globules at the base of the chamber 68 flow via gravity through the water gravity via a tube 70 to the bottom of the main chamber 48. In one embodiment, the line 70 has an inner diameter of between ⅛ and ¼ inches. The water that is collected at the bottom of the main chamber 48 is evacuated by a water float level switch 72 which mechanically opens a hinged valve 74. There is also an option of using two conductivity points, or probes (not shown), that make contact as the water rises in order to complete a circuit to signal either a pneumatic or electric valve which may discharge the water that is in the main chamber 48. There may also be a manual drain at the bottom of the main chamber 48 for manual periodic maintenance.

The composition of the main chamber 48 can be stainless steel, or polyethylene. Constructing the main chamber 48 of carbon steel is discouraged since oxidation and rusting can quickly occur. Also, the use of tygon tubing, polyvinyl chloride, and vinyl chloride should be discouraged in that the silicone-based solvent will remove the platicizer leaving the material brittle. Other products that are unaffected by the solvent may also be used.

The use of silicone-based solvent allows for latitudes in temperatures that have not traditionally existed in the dry cleaning field. The importance of controlling the temperature of the liquid solvents that are used in the field of dry cleaning is critical.

The most prevalent solvent used as previously stated is PERC whose temperature is ideally maintained at a range of 78 to 82 degrees Fahrenheit. This is also a common range for all other solvents currently being used in the field of dry cleaning. If the temperature should increase, the result is a much more aggressive solvent resulting in damage to textiles being processed. The increase in the KB (kari butyl) value most often results in causing dyes to be stripped from articles being cleaned, resulting in the transfer of these dyes to other articles being cleaned. The concern for controlling temperature has caused manufactures of dry cleaning machines to install water cooling coils placed in the base tanks, and in-line water cooling jackets on the plumbing lines for heat transfer.

By increasing the temperature of the silicone-based solvent of the present invention to a range of 90 to 130 degrees Fahrenheit, an aggressiveness in cleaning is afforded, without the result of pulling or stripping dyes. This is best accomplished by circulating water in a closed loop fashion between a hot water tank and through a circulating pump and through the coils (previously used for cooling) and back to the hot water tank. The circulating pump is controlled by a temperature probe that can be placed in the solvent. The result is precisely controlled solvent temperature which influences the aggressiveness of the solvent without causing damage to the articles being cleaned.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A system containing a siloxane solvent composition and capable of separating water from a siloxane solvent during dry cleaning comprising:

(a) an inlet that receives a mixture of dry cleaning fluid and water from a condenser of a dry cleaning apparatus, wherein the dry cleaning fluid includes a siloxane solvent composition;

(b) a flow controller for urging a flow of the mixture received from the inlet;

(c) a separator containing a coalescent media that receives the mixture urged by the flow controller;

(d) a chamber coupled to the coalescent media for receiving the mixture from the coalescent media to separate the dry cleaning fluid and the water; and (e) an outlet coupled to the chamber to remove the dry cleaning fluid from the chamber in the substantial absence of the water.

2. The system recited in claim 1, and further comprising a filter coupled to the inlet having perforations with a dimension between 10 to 100 microns.

3. The system recited in claim 1, wherein the inlet is plumbed to avoid low points that allow accumulation of the water.

4. The system recited in claim 1, and further comprising a second coalescent media coupled to the inlet for further coalescing.

5. The system recited in claim 1, and further comprising a second coalescent media coupled to the outlet for further coalescing.

6. The system recited in claim 1, wherein the flow controller is a vacuum.

7. The system recited in claim 1, wherein the flow controller is a pump.

8. The system recited in claim 7, wherein the pump is activated by a float level switch.

9. The system recited in claim 7, wherein the pump is an electrical pump.

10. The system recited in claim 7, wherein the pump is a pneumatic pump.

11. The system recited in claim 1, wherein the water in the chamber is drained.

12. The system recited in claim 11, wherein gravity urges the water from the chamber through a drain tube.

13. The system recited in claim 12, wherein the water is drained from the chamber through a hinge valve activated by a float level switch.

14. The system recited in claim 12, wherein the water is drained from the chamber through a valve that is activated by conductivity created by two probes that complete a circuit upon the water rising to a level.

15. The system recited in claim 1, wherein the dry cleaning fluid is circulated through filters to filter out particulate soil and to prevent polymerization of the dry cleaning fluid.

16. The system recited in claim 1, wherein a temperature of the dry cleaning fluid is maintained between 90 and 130 degrees Fahrenheit.

17. The system recited in claim 1, wherein up to three coalescing mediums are positioned between the inlet and the outlet.

18. A method of separating water from a solvent during dry cleaning comprising the steps of:

(a) immersing articles to be dry cleaned in a dry cleaning fluid including a siloxane solvent composition;

(b) agitating the articles in the siloxane solvent composition;

(c) removing a mixture of the dry cleaning fluid and any water from the articles by vaporizing the dry cleaning fluid and water;

(d) receiving the vapors and condensing the vapors;

(e) urging a flow of the condensed vapors through a coalescent media; and (f) separating the dry cleaning fluid from the water.

* * * * *